(No Model.) 2 Sheets—Sheet 1.

D. P. TIPTON.
CURRY COMB.

No. 384,798. Patented June 19, 1888.

Witnesses.
R. J. Tipton.
Alice Atkinson.

Inventor.
D. P. Tipton (No Model.) 2 Sheets—Sheet 2.
D. P. TIPTON.
CURRY COMB.
No. 384,798. Patented June 19, 1888.
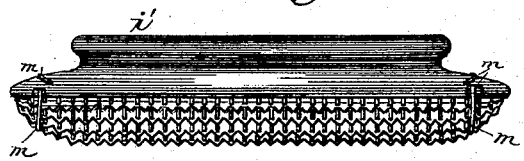
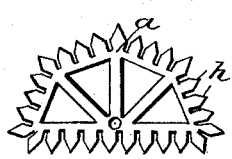
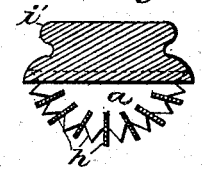
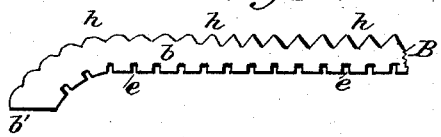
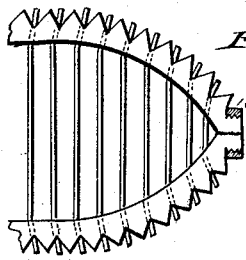
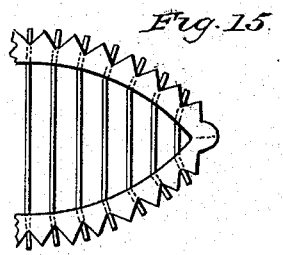
Witnesses.
R. S. Tipton.
Alice Atkinson.
Inventor.
D. P. Tipton.

UNITED STATES PATENT OFFICE.

DIE PERRY TIPTON, OF BROWNVILLE, NEBRASKA.

CURRY-COMB.

SPECIFICATION forming part of Letters Patent No. 384,798, dated June 19, 1888.

Application filed October 17, 1887. Serial No. 252,608. (No model.)

*To all whom it may concern:*

Be it known that I, DIE PERRY TIPTON, of Brownville, in the county of Nemaha and State of Nebraska, have invented a new and Improved Curry-Comb, of which the following is a description.

My invention relates to curry-combs, and has for its object the production of a device which is much more efficient and better adapted for cleaning animals (especially the legs and bony parts) than any curry-comb yet invented.

The invention consists in certain novel features of construction, all as hereinafter described and claimed.

It is a well-known fact among horsemen and others having to do with stock that the ordinary curry-comb is painful to a sensitive animal, especially on its legs and bony parts, and also that from its shape it is poorly adapted for use between the front legs, about the elbows, about the knees and hock-joints, along the tendons on the legs, between the hoofs and pastern-joints, and on all the portions of the body where the surface is uneven. I overcome these objections and others not necessary to mention through the configuration and general construction of my device.

Reference is had to the drawings forming part of this specification, in which similar letters indicate corresponding parts in all the figures.

Figure 1:
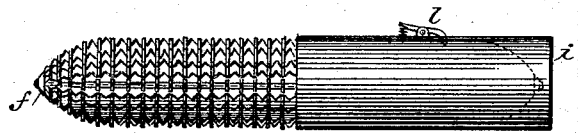
Figure 2:
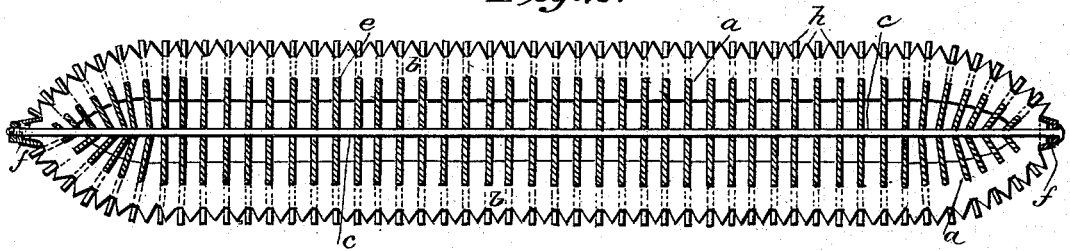
Figure 3:
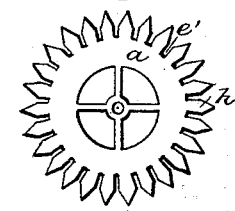
Figure 4:
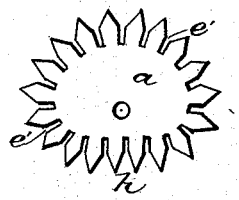
Figure 5:
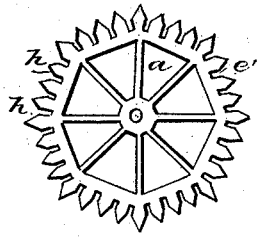
Figure 6:
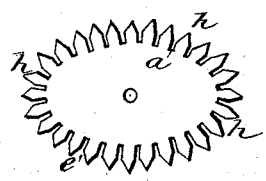
Figure 7:
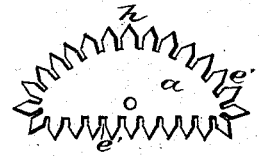

Figure 1 represents a side elevation of a curry-comb, showing an adjustable handle thereto. Fig. 2 is a longitudinal central vertical section through a comb with the adjustable handle removed and on a scale nearer working size than shown in Fig. 1. Figs. 3, 4, 5, 6, 7, and 8 represent modified forms of the cross-disks. Fig. 9 represents a side view of a comb provided with a fixed handle, the cross-disks being secured in grooves in said handle. Fig. 10 represents a vertical cross-section through Fig. 9 between two of the cross plates or disks. Fig. 11 represents a part of one of the longitudinal strips which are employed in connection with the cross-disks, and which shows teeth or ribs of different form on the same strip. Fig. 12 represents a detached portion of a comb with the longitudinal strips and the slots in the cross-plates omitted to better illustrate the alternate cross-plates provided with teeth and corrugations or scallops. Fig. 13 represents an end view of a securing-ring having grooves corresponding to the number of lateral plates which enter said grooves. Fig. 14 shows screw-threaded lateral plates and threaded ring. Fig. 15 shows the lateral plates as brazed or soldered together and the central rod omitted.

A curry-comb similar to Figs. 1 and 2 is constructed as follows: Cross plates or disks $a$ are threaded or strung upon a rod, $c$, and are spaced the distance between the slots $e$ in the longitudinal strips $b$, the slots $e$ in said strips matching with the slots $e'$ in the cross-plates $a$. By this interlocking of the edges of the two sets of strips and plates a very rigid and substantial device is produced. The longitudinal strips $b$ extend from end to end of the comb, and their ends are so formed as to enter rings or washers $f$, placed upon the ends of the rods $c$, upon which the cross-plates are threaded. Said rings or washers may be beveled or flared to correspond to the shape of the ends of the strips $b$, as shown in Fig. 2, or the rings might be formed with internal grooves, as shown in Fig. 13, corresponding to the number of the strips $b$, if found preferable; or the ends of said strips may be so formed as to just snugly fill the conical recess in the rings or washers and around the rod $c$, as shown in Fig. 2. When the cross-disks and the longitudinal strips have been properly placed relative to each other, a nut, as $g$, upon one end (or both, if desired) of the rod $c$ is screwed up and the rings or washers are drawn up snugly on the ends of the strips $b$, and the device is complete.

It is evident that the central rod $c$ is not essential to the device, since the interlocking of the strips and plates forms a very rigid structure without said rod. When omitting said rod, the ends of the strips $b$ could be screw-threaded and rings or washers $f'$ correspondingly threaded and screwed thereon, as in Fig. 14; or the rings might be soldered on the ends of the strips $b$, or said strips might be soldered or brazed together at their ends and the rings entirely omitted in such case, as shown in Fig. 15.

The teeth $h$ in the longitudinal strips and in the cross-plates may be made of the same shape, and the slots $e$ in the strips and $e'$ in the plates or disks should be of such width as to correspond with the strips or plates that are to enter them and of such depth that when interlocked all the teeth will be of equal height and present an even surface. It is not essential, however, that the teeth should be always alike in the two sets of plates and strips, and a good result would be obtained by making the strips with teeth of one form and the cross-plates with teeth of another form. Still another construction would be to form the cross-plates alternately with teeth and scallops or corrugations, as clearly shown in Fig. 12. In this construction the corrugated plates would prevent the sharp teeth from scratching the skin of the animal too severely, and would also enable the comb to glide smoothly over the skin. In this construction the slotted strips $b$ will of course be employed. They were omitted from Fig. 12 to better represent the alternately saw-toothed and corrugated or scalloped plates.

Forming the teeth of a curry-comb upon the edges of cross-plates and strips having teeth and slots and the two sets interlocking with each other is believed to be new and of great importance in this class of devices. This formation of the outer or operating surface by the plates and strips crossing each other forms in effect a cellular structure of great strength, the sides of the cells being partially formed by the teeth of the comb, and its open or mesh-like surface prevents the cells from becoming clogged or filled with dust and dirt.

It is apparent, of course, that it is not absolutely necessary that all of the strips and cross-plates be slotted or notched, but merely enough of them to give sufficient rigidity to the operating-surface of the device.

It will be observed that the disks or plates $a$ diminish in size toward the ends of the comb, and are so inclined that their teeth stand at about right angles to the spheroidal end surfaces, as do also the teeth on the longitudinal strips $b$. (See Fig. 2.) The same effect may be produced by merely inclining the teeth on the end cross-plates, the disks standing at right angles with the central rod, $c$.

It will readily be apparent that in forming a comb from the cross-disks shown in Figs. 4, 5, 6, 7, 8, 10, and 11 it will be necessary to change the form of the strips $b$, so as to adapt them to the shape of the several disks $a$. The disks or plates $a$ may be made skeleton or solid, as shown in Figs. 3, 5, and 8 and 4, 6, 7, 10, and 12, respectively. In the comb shown in Figs. 9 and 10 the cross-plates $a$ need not be toothed on their bottoms, but be left plain, and that portion will be forced into grooves or channels cut across or otherwise formed in the under face of the handle $i'$. The lower outer ends, $b'$, (see Fig. 11,) of the strips $b$ of such a comb might also be set into the handle in a similar manner and secured to the handle by passing a wire, $m$, around them near the ends of the comb, and then passing the wire through holes in the handle and securing the ends.

In Fig. 1, $i$ represents an adjustable or removable handle, which can be slid from one end of the comb to the other and held from moving, when in use, by a spring-pressed catch, $l$, the end of which takes into the cell or space between the sides of the teeth.

It may be desirable to have a comb with two different surfaces or kinds of teeth, half of the comb being more harsh than the other, and this I provide for by making the longitudinal strips with different tooth-surfaces—say half of the teeth of one form and the other half of a different form, as is indicated in Fig. 11, where the teeth on the left are different from those at the right. A similar change, of course, could be made in the teeth on the cross plates or disks $a$, if desired.

It should be borne in mind that the particular in which all curry-combs yet invented or manufactured are defective is, that they are by their form utterly unadapted for use between the front legs, about the elbows, about the knees and hock-joints, along the tendons on the legs, between the hoofs and pastern-joints, and on all the portions of the body where the surface is uneven, and that the great advantage my species of comb possesses over all others arises from its convex curved configuration and the facility such configuration affords for reaching and cleaning without pain and annoyance all the above-mentioned parts of an animal.

A comb constructed as above described constitutes, substantially, an elongated member or body having a convex curved working-face, as distinguished from the ordinary form of curry-comb, wherein the working-surface is flat, or substantially so, and is more or less horizontally extended, by reason of which it is poorly adapted for use about the angular and bony parts of an animal. The feature of the long, slender, curved, and spheroidal working-surface of my comb, together with my peculiar arrangement of the teeth in intersecting rows, making it possible to use the comb either laterally or longitudinally with reference to its length, renders it perfectly adapted to all the irregular parts of an animal, which parts it is impossible to reach with the old style of comb. The form of said comb further renders it capable of rotary operation, or a combined reciprocal and rotary operation.

Having thus described my invention, what I claim, and desire to secure by Letters Patent, is—

1. A curry-comb with a working-surface of an elongated cylindrical or equivalent form, substantially as shown and described.

2. A curry-comb with a working-surface of an elongated cylindrical or equivalent form, with an end of a conical form, substantially as shown and described.

3. A curry-comb composed of longitudinal toothed strips and toothed cross-plates interlocked therewith, substantially as set forth.

4. A curry-comb having a body of cylindrical or equivalent form in cross-section, composed of detachable strips and plates and provided with a conical end or ends, substantially as set forth.

5. A curry-comb of cylindrical or equivalent form, provided with a handle longitudinally adjustable thereon, substantially as set forth.

6. A curry-comb consisting of detachable toothed strips and disks or plates arranged at angles to each other and means for securing them in place, substantially as set forth.

7. A curry-comb composed of longitudinal strips and cross plates or disks interlocked therewith, some of said strips and plates being provided with saw-shaped teeth and some with teeth formed by corrugations or scallops, substantially as set forth.

8. In a curry-comb, the combination of the longitudinal strips and cross-plates and the handle slipped over said parts and capable of longitudinal adjustment thereon, substantially as set forth.

9. In combination with the curry-comb constructed as described, the tubular handle adjustable thereon and the locking pawl or dog carried thereby, substantially as described.

10. In a curry-comb, the combination, with the toothed strips $b$, provided with notches on their lower edges, of slotted cross-plates interlocked therewith and means for securing the said parts together, substantially as set forth.

11. In a curry-comb, the combination of longitudinal and transverse interlocking strips and means for securing the ends of the strips, substantially as set forth.

12. A curry-comb of cylindrical or equivalent form in cross-section, having a cellular body, the sides of the cells being formed by the toothed or operating surface of the comb, substantially as described.

13. In a curry-comb, the combination of the central rod, the toothed disks strung thereon, the longitudinal toothed strips interlocking with the disks, and means for securing said parts together, as set forth.

14. In a curry-comb, the combination of the rod $c$, the toothed plates $a$, having slots $e'$ strung thereon, the longitudinal toothed strips $b$, having notches $e$ and curved ends $b'$, the washers $f$, and the nuts $g$, substantially as described.

DIE PERRY TIPTON.

Witnesses:
ALICE ATKINSON,
B. B. HOADLEY.